Aug. 11, 1925.
E. DEAN
MAGNIFIER FOR VIEW FINDERS
Filed March 1, 1923
1,549,105
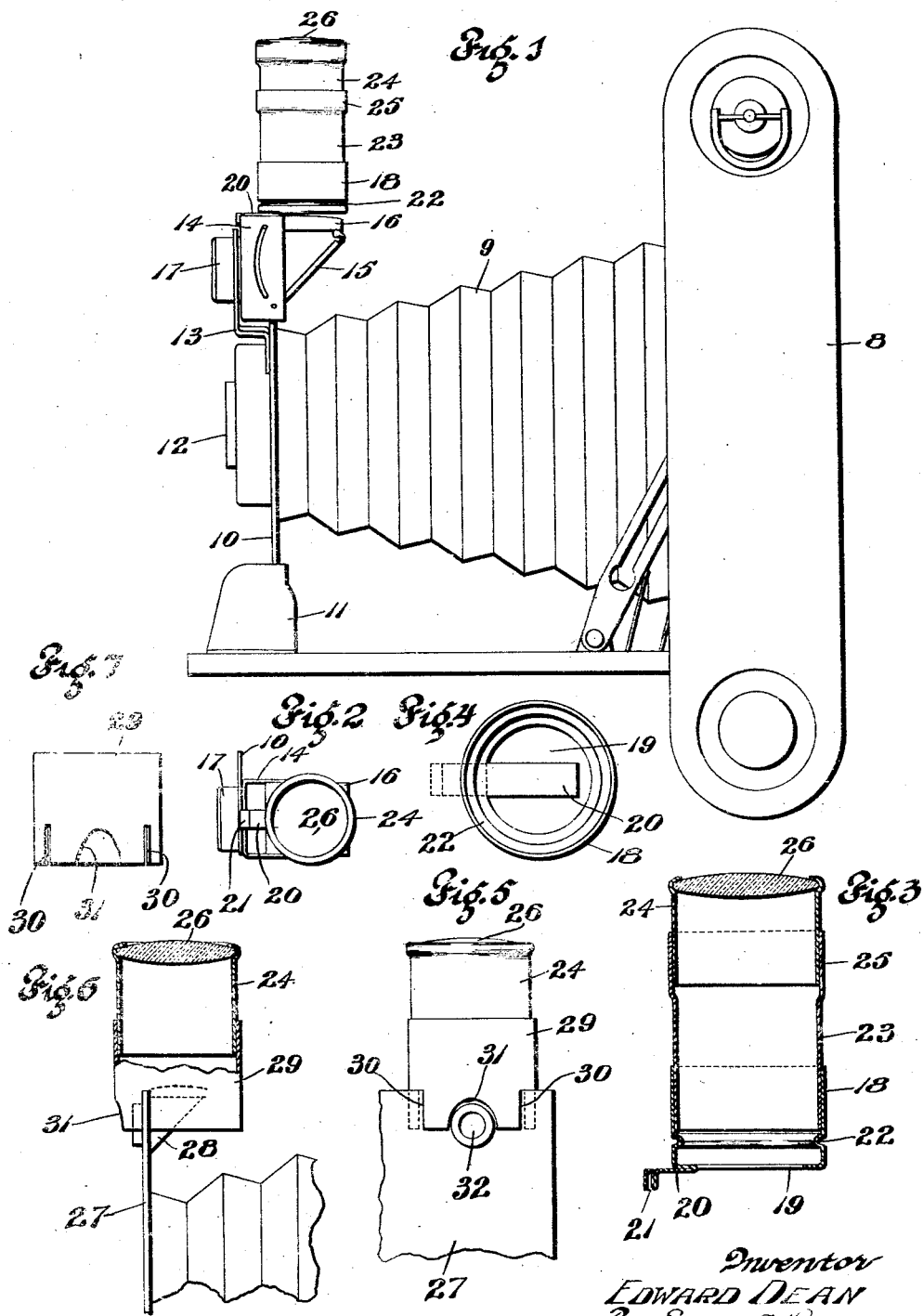
Inventor
EDWARD DEAN
By Edward E. Longan
Atty.

Patented Aug. 11, 1925.

1,549,105

UNITED STATES PATENT OFFICE.

EDWARD DEAN, OF ST. LOUIS, MISSOURI.

MAGNIFIER FOR VIEW FINDERS.

Application filed March 1, 1923. Serial No. 622,051.

*To all whom it may concern:*

Be it known that I, EDWARD DEAN, a citizen of the United States, and resident of the city of St. Louis and State of Missouri, have invented certain new and useful Improvements in Magnifiers for View Finders, of which the following is a specification, containing a full, clear, and exact description, reference being had to the accompanying drawings, forming a part hereof.

My invention relates to improvements in magnifiers for view finders, and has for its object an attachment for camera view finders which will enlarge and sharpen the view on the finder, so that the proper location of the principal objects to be photographed can be readily obtained.

I have found that the view as disclosed in camera finders, especially in small cameras, is at best hazy and indistinct, and still more so when the view to be photographed is at some distance. In fact, some objects appearing on the photograph were invisible on the finder, and thus the photograph was not properly positioned on the film or plate, with reference to the importance of these objects—it frequently occurring that objects which were intended to be in the center of the photograph, or occupying a prominent place therein, appeared to one side or were missed altogether. With my attachment this defect is rectified, and a sharp image of the field covered by the finder is seen on the finder glass. In fact, with my attachment the view finder of a camera becomes substantially a field glass when my attachment is applied thereto.

In the drawings,

Fig. 1 is a side elevation of one form of camera, with my device attached thereto;

Fig. 2 is a top plan view of the finder with my device in position;

Fig. 3 is an enlarged vertical section of my improvement;

Fig. 4 is a top plan view of the lower section of my improvement before receiving its final shape, and showing the manner of punching the bottom for forming the retaining or securing member;

Fig. 5 is a fragmental front view of another form of camera, showing a modified construction of magnifier attached thereto;

Fig. 6 is a side elevation of the same with portions broken away and in section;

Fig. 7 is a front elevation of the lower portion of the magnifier made use of in Figs. 5 and 6.

In carrying out my invention, I employ a camera 8, which is provided with a bellows 9, to the front of which is secured a plate 10. This plate is carried by the slide 11. The plate 10 also carries the lens 12. To the plate 10 is attached a bracket 13 to which the view finder is secured. This view finder is composed of a substantially U-shaped member 14, to which is pivotally attached a mirror or reflector 15. This mirror or reflector is arranged at an angle of forty-five degrees. Extending in a horizontal direction above the mirror 15 is a frame 16 which carries a glass on which the image transmitted through a lens 17 is reflected. This construction of view finder is well known in the art, and therefore its general construction and operation will not be described in detail.

My magnifier consists of a bottom cup-shaped portion 18, which when stamped is closed at its bottom, but has a portion 19 cutaway so as to leave a tongue 20. This tongue is bent forward as indicated in Fig. 3, and its end folded so as to form a socket 21. This socket is adapted to fit over the U-shaped portion 24. The tongue 20 is of such length that when formed as in Fig. 3, the cup 18 will be centered over the frame 16 carrying the glass on which the view is reflected. The cup 18 is also provided with a bead 22 which is primarily intended for stiffening purposes, although it acts as a limit for the insertion of either the intermediate member 23, or lens carrying member 24. The intermediate member 23 is tubular in form, and is provided with an enlargement 25, which extends for some distance from its one end. This enlargement is adapted to receive the end of the tube 24 to one end of which a lens 26 is secured. The members 18, 23, and 24, are telescopically secured together so that a certain amount of adjustment is possible. This adjustment is necessary to get the proper focus of the lens 26, which focus varies according to the eyes of the person using the same and is accomplished without shifting the focal center of the lens.

In Figs. 5, 6, and 7, I have shown a modified form of construction in which 27 indicates the plate which carries the lens and to which the view finder 28 is also secured. In this modification the lower section 29 of my improvement is provided with slots 30 which are adapted to fit over one edge of the plate 27. The lower section 29 is also provided with a cutaway portion 31, which cutaway portion is designed to leave the finder lens 32 clear and unobstructed. In mounting this device, the slots 30 allow the plate or front 27 to pass therein, (see Figs. 5 and 6) and the cutaway portion 31 does not obstruct the finder lens 32. In this device the member 24 is preferably inserted directly into the member 29, although the intermediate member 23 may be employed, if desired.

I may, however, eliminate the member 23 entirely from either construction, or may place more intermediate members between the lens and securing member,—this feature depending entirely upon the focus of the lens 26.

By the use of my device I have been enabled to obtain photographs of objects at a very great distance, and locate them accurately on the negative, something which was not possible with an ordinary camera, since the objects shown on the glass of the view finder were so small or indistinct as to be practically invisible. This is especially true of church spires, tall chimneys, etc., when viewed and photographed from a distance, as their appearance on the ordinary view finder is so thin and small as to be practically invisible to the naked eye, and still it is essential when they form the main feature of a photograph to have them properly located.

In my device the magnifying of the view brings out every detail caught by the finder lens sharp and clear, and this makes it possible to obtain photographs which emphasize and bring into proper perspective the main features desired, which were heretofore lost by not being able to properly locate the same.

Having fully described my invention, what I claim is:

A magnifier comprising a lens mounting, a lens secured in said mounting, a second mounting, a tongue formed integral with and projecting from said mounting at its end, said tongue provided with means whereby said second mentioned mounting may be removably secured to a camera and centered over the view finder thereof, said second mentioned mounting adapted to telescopically receive the first mentioned mounting.

In testimony whereof, I have signed my name to this specification.

EDWARD DEAN.